United States Patent
Cole et al.

(10) Patent No.: US 6,571,239 B1
(45) Date of Patent: May 27, 2003

(54) MODIFYING A KEY-WORD LISTING BASED ON USER RESPONSE

(75) Inventors: Alan George Cole, Katonah, NY (US); Yael Ravin, Mount Kisco, NY (US); Howard Edward Sachar, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/463,825

(22) Filed: Jan. 31, 2000

(51) Int. Cl.[7] .............................................. G06F 17/30
(52) U.S. Cl. .............................................. 707/5; 707/3
(58) Field of Search ...................... 707/1–10, 100–104, 707/500–502, 505–511, 513–531

(56) References Cited

U.S. PATENT DOCUMENTS 5,685,003 A * 11/1997 Peltonen et al. ............... 707/1

6,334,124 B1 * 12/2001 Bouchard et al. ............. 707/10

* cited by examiner

Primary Examiner—Alford Kindred
(74) Attorney, Agent, or Firm—Louis P. Herzberg

(57) ABSTRACT

This invention provides methods, apparatus, system, and article of manufacture which solve the problem of mismatch between the keywords employed by a user in making a query and those assigned by the manual or automatic classification system stored in the system's keyword index. The system records the initial keyword(s) input by the user and holds them until the user is either satisfied or gives up. If in a query session the user is satisfied with the object(s) retrieved from the repository, the system associates the initial keywords(s) with the retrieved object(s). This facilitates the object's retrieval by the same user or subsequent users who input the same keywords. The keyword index is modified directly when, for example, a single service or application controls the interaction between user and repository, end to end.

39 Claims, 5 Drawing Sheets

Overall Flowchart
◄────── Alternative A
◄─ ─ ─ Alternative B

Overall Flowchart
Alternative A ——
Alternative B - - ->

Flowchart for updating keyword-object associations

Logic for deleting from the Index:

| freq.<br>date | high | low |
|---|---|---|
| new | no delete | no delete |
| old | delete from aux Index and move to primary index | delete from Index |

Fig. 4

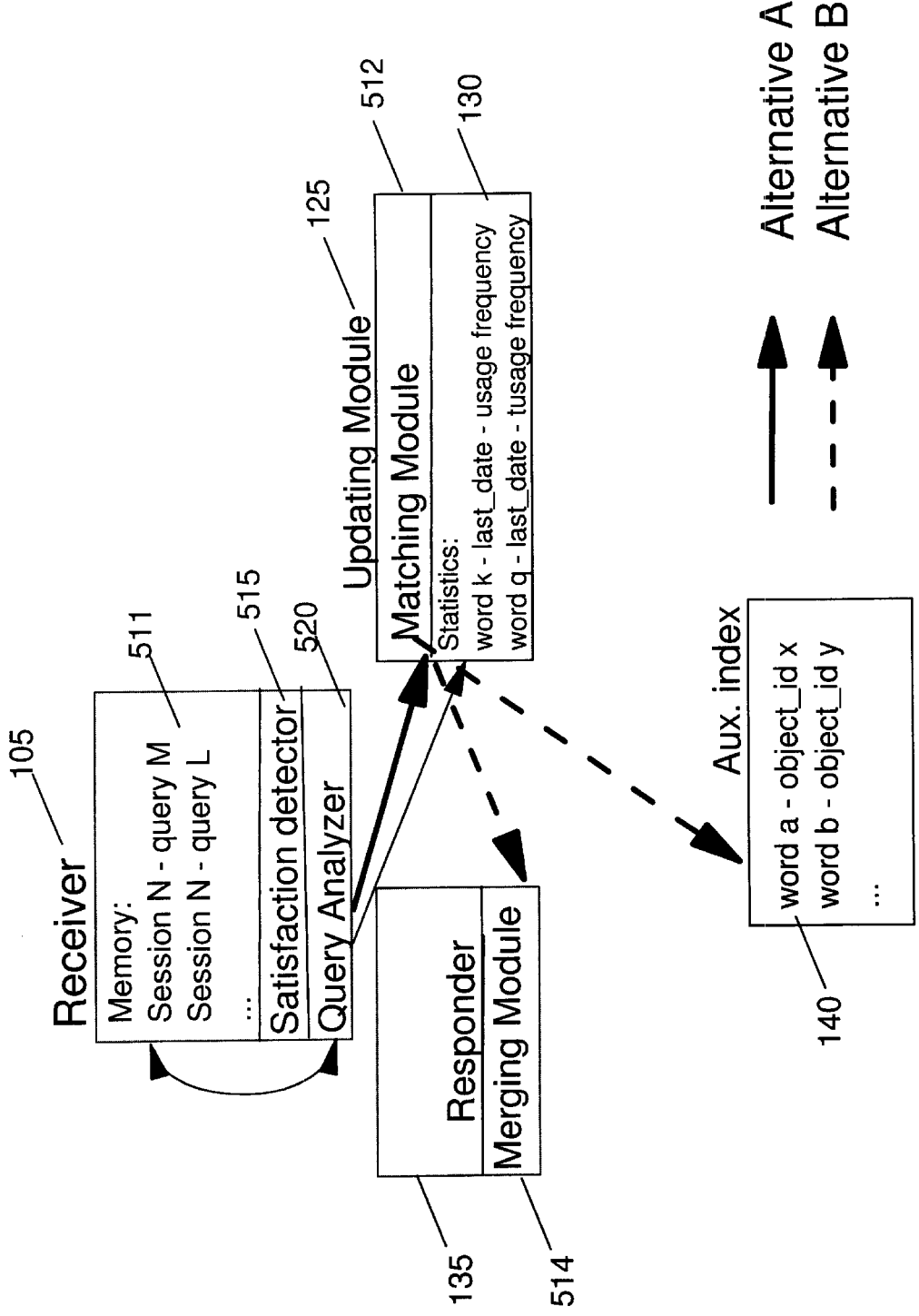
Figure 5: Embodiment of the updating apparatus

MODIFYING A KEY-WORD LISTING BASED ON USER RESPONSE

FIELD OF THE INVENTION

The present invention relates to the field of information retrieval. More specifically, it is directed to a system and method for incrementally updating and modifying a keyword index in response to user feedback.

BACKGROUND OF THE INVENTION

Existing keyword search engines for information repositories typically have two components. The first component may be described as a system for classifying a corpus of documents or other objects, such as images. The result of this process is a set of indices or similar data structures that associate keywords or terms with the documents or other objects. The second component provides a means for a user of the search engine to express a query. This component analyzes the query and uses the data structures provided by the first component to provide a set of objects which are deemed to be relevant to the user's query.

The classification of the information may be a manual process, in which a human classifies each object. This classification may be done by one or more skilled specialists. Alternatively, it may be done by relatively less skilled individuals, such as the authors or creators of the objects, who select descriptive keywords. In another alternative, the classification of documents may be an automatic process, performed by computing systems and software. This generally uses a variety of means to extract a meaningful description of each object. This includes, for example, analyzing text in the document's title, abstract, or body, or by automatically detecting patterns in images, and so on.

Whether the classification is manual or automatic, in either case the result is a keyword list with associated data that can be used to retrieve relevant objects for a user query. Again, this is accomplished in existing embodiments by a variety of means. At its simplest, each word or phrase in the keyword list points to a list of objects which were classified by that word or phrase, and that list of objects is returned when the query contains that word or phrase. Many variations of this basic method have been developed, including ranking the returned objects by analytical or statistical properties that are intended to reflect the presumed relevance or importance of the object.

From the viewpoint of the invention described here, these existing methods possess two shortcomings. Firstly, the keywords and terms employed by a user in making a query may not agree with the keywords and terms assigned by the manual and/or automatic classification system, and the search words of different users may differ greatly from one another. Secondly, while the sorts of queries provided by an audience of users may change relatively rapidly in response to current events, changing fashion, and other vagaries of public interest, the classification scheme itself is relatively static and only slowly changing. Because of both these factors, there can be a substantial mismatch between the classification system used to classify objects and that employed by users in making their queries. This is a mismatch that grows with time.

The result of this mismatch is that the search engine may fail to find many of the relevant objects, and more of the objects it does retrieve will be irrelevant to the intended query. Thus the user may frequently fail to find the desired information. In order to provide better search results, new methods are required to update the keyword list and classification scheme used in information retrieval systems.

SUMMARY OF THE INVENTION

In one aspect, the present invention provides a method, apparatus and article of manufacture to modify the associations between objects in the database and keywords in the index, based on keywords supplied by the user during a search session. These modified associations keep the classification of objects in the database up to date.

Another aspect of the present invention defines a user session as an interaction of a user expressing a query with a database of objects and associated keywords. The invention provides a method for determining user's satisfaction with the results of the search.

Other aspects and a better understanding of the invention may be realized by referring to the Detailed Description.

BRIEF DESCRIPTION OF THE DRAWING

These and other objects, features, and advantages of the present invention will become apparent upon further consideration of the following detailed description of the invention when read in conjunction with the drawing figures in which:

FIG. 4 shows an example of an overall flow of the system in accordance with the present invention.

FIG. 5 shows an example embodiment of an updating apparatus in accordance with the present invention.

DESCRIPTION OF THE INVENTION

The present invention provides methods, apparatus and articles of manufacture which solve the problem of mismatch between the keywords employed by a user in making a query and those assigned by the manual or automatic classification system stored in the system's keyword index. In an embodiment of the present invention, the system records the initial keyword(s) input by the user and holds them until the user is either satisfied or gives up. If in a query session the user is satisfied with the object(s) retrieved from the repository, the system associates the initial keyword(s) with the retrieved object(s). This facilitates the object's retrieval by the same user or subsequent users who input the same keywords. The association of new keywords with data objects is implemented in different ways, depending on whether modification of the master keyword index is allowed or desirable. Two alternative example embodiments are described below. Alternative A details a case in which the keyword index is modified directly. This is feasible, for example, when a single service or application controls the interaction between user and repository, end to end. Alternative B details the case in which the master keyword index is not modified. This is the case when the process interacting with the user does not have permission to change the master index. This occurs when, for example, only experienced librarians may have authorization to modify it. In this case, new keywords are stored in an auxiliary index. An external process merges both the master and auxiliary indices before returning the results to the user.

Figure 1:
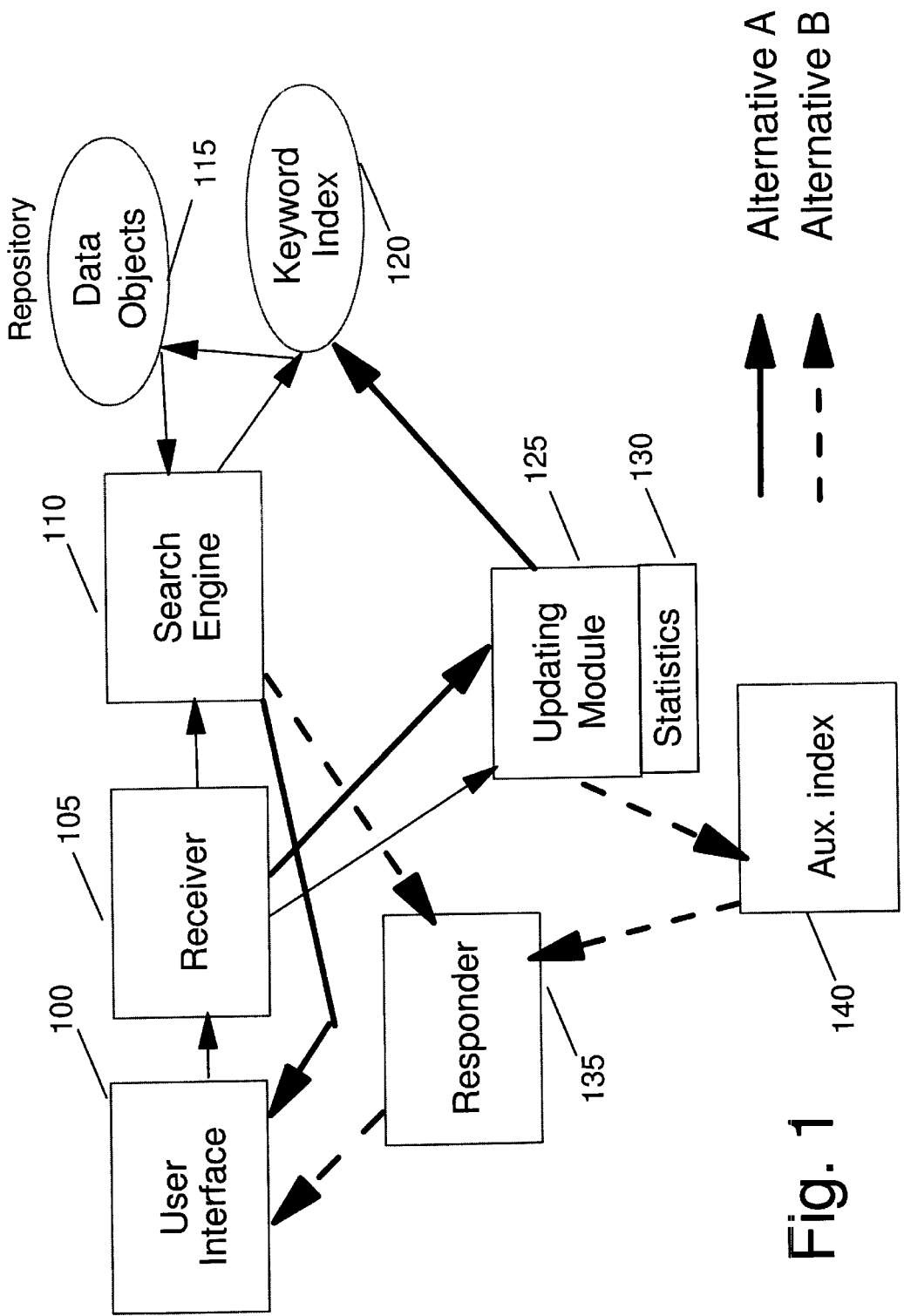
FIG. 1 shows an example of a system implementing the present invention.

An example of a system implementing the present invention includes the parts shown in FIG. 1. A User Interface (100), for users to input queries, which may be on the same machine as the rest of the system, is connected in a client-server architecture or via the Internet. Users formulate queries in a variety of ways: freetext (or natural language), keywords (with or without Boolean expressions), by selecting choices from a menu, etc. The queries are passed to a Receiver (105). When the first query arrives from a user, the Receiver initializes a session log, and associates the log with this first query. The Receiver (105) closes the log when the user inputs a response that indicates satisfaction, or when the session times out because the user has been inactive past a certain time limit. The Receiver (105) passes the query to the rest of the system for further processing. Under Alternative A, the Receiver passes the query to a Search Engine (110), which matches the query against the (modified) Keyword Index (120). The keywords in the Keyword Index (120) are associated with one or more objects in the Repository (115). If the query matches one or more keywords in the Index (120), the data objects associated with those keywords, or a description of these objects, such as a hitlist of titles, thumbnails, etc., are retrieved from the Repository and returned to the Search Engine (110). The Search Engine (110) in turn passes them to the user interface (100). In Alternative B, where the Keyword Index does not change, the Receiver (105) passes the query to the Updating Module (125) besides passing it to the Search Engine (110). The Updating Module (125) matches the query against the Auxiliary Index (140), using a matching identical or similar to the matching done by the search engine. The Auxiliary Index (140) includes keywords associated with data objects in the Repository. In some embodiments, the Auxiliary Index (140) has the same structure as the Keyword Index (120). Under Alternative B, both the Search Engine (110) and the Auxiliary Index (140) return the relevant data objects (or descriptions) to Responder (135). The Responder (135) merges the two lists and passes the combined result to the user interface (100).

This iterative process—query, match against keywords, and return of relevant data—continues until the user's response indicates satisfaction with one or more objects retrieved. This marks the end of a query session. Satisfaction could be measured in several ways. Some level of satisfaction is indicated if the user requests to see the object in full, which may take time. Further satisfaction is indicated by other responses. For example, satisfaction is indicated when the user starts a transaction to pay for downloading the object. The end of a session can also be explicitly indicated by a user response, in which the user marks objects as relevant or irrelevant at the User Interface (100). This constitutes an accurate way to measure user's satisfaction with the objects. Unfortunately, users seldom provide this kind of feedback even if the User Interface (100) is capable of collecting it.

At the end of the session, the Receiver (105) analyzes the first query into keywords. In one embodiment, this analysis is trivial, such that the whole query is taken to be a single keyword. In an alternate embodiment the Receiver (105) actually separates the query into single words and/or multi-word phrases. This depends upon how much knowledge the Receiver (100) has of the structure of the Keyword Index. If Boolean operators are used in the query (Clinton AND Lewinsky, for example), these combined objects are also stored. If appropriate, the Receiver breaks up a complex Boolean query into simpler, logically equivalent Boolean expressions. The Receiver (105) then associates the resulting keywords (or Boolean expressions) with the object(s) or description(s) of the object(s) chosen by the user. This is done by linking each keyword with the object's id returned by the Search Engine (110) or the Auxiliary Index (140). Under both alternatives, the Receiver (100) passes this association information gathered during the session to the Updating Module (125). Under Alternative A, the Updating Module (125) updates the master Keyword Index (120) with this information. Under Alternative B, it updates the Auxiliary Index (140).

In a particular embodiment, the Updating Module (125) optionally keeps statistics (130) about the session information. This includes information such as a time stamp, which indicates how recently the keyword(s) have been used. It often also keeps other statistics, such as the number of sessions associated with keyword(s), to indicate the frequency of use of the keyword. These statistics are subsequently employed to make decisions about whether and how long to keep associations between keywords and data objects either in the master Keyword Index (120) in Alternative A, or in the Auxiliary Index (140) in Alternative B.

Figure 2:
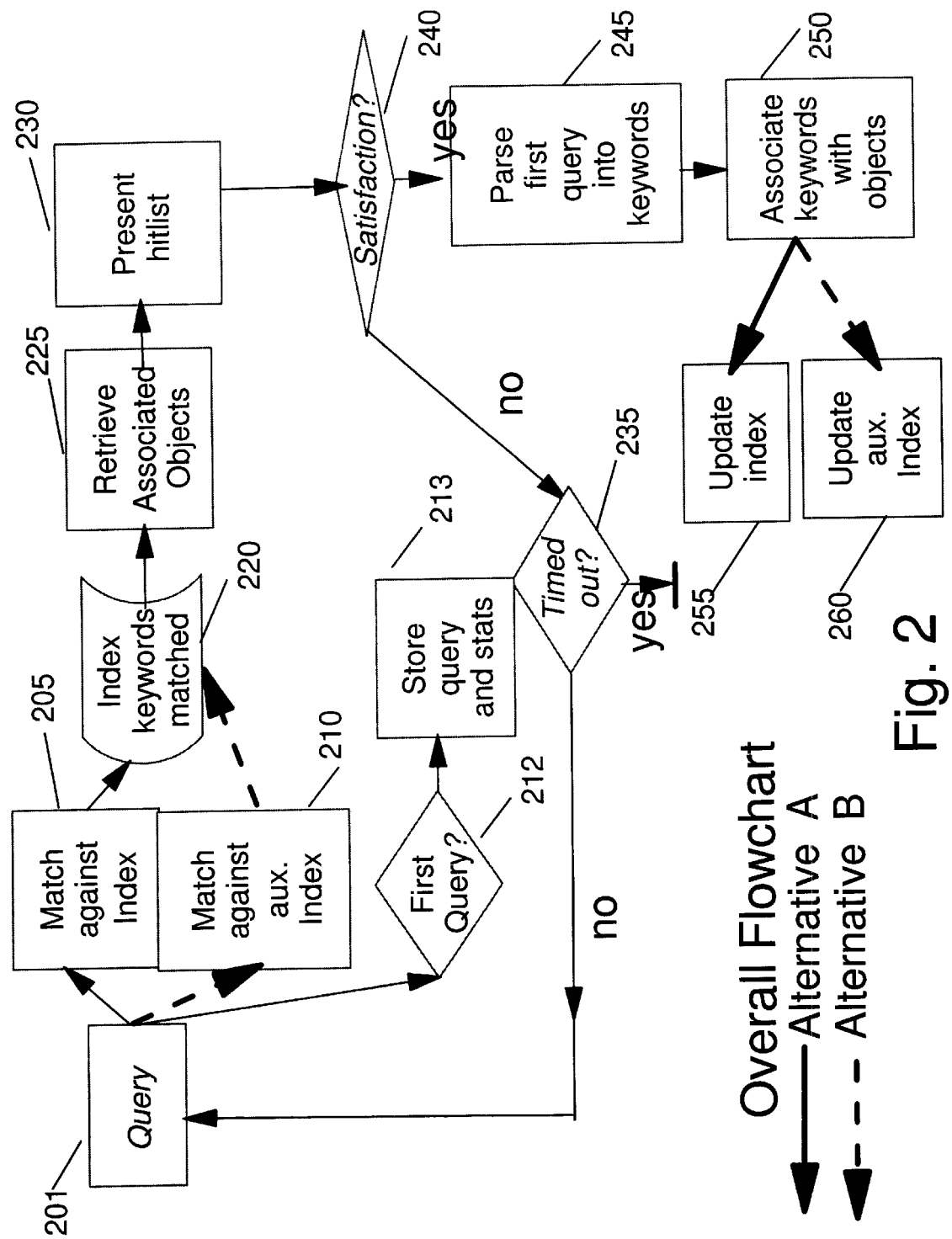
FIG. 2 shows an example embodiment of the logic for deletion of keyword-object associations in accordance with the present invention.

The logic for deletion of keyword-object associations takes various forms. One embodiment shown in FIG. 2, sorts associations from oldest to newest and from lowest to highest frequency. When the Index (120), or Auxiliary Index (140), reaches a maximal size determined by the application or the constraints of the hardware, the oldest and least frequent associations are deleted. A precise formula, combining date and frequency, is often defined as needed. Associations that are new and frequent are generally kept, in so much that they reflect current and common ways of referring to objects. These are most beneficial to subsequent users. Associations that are new and infrequent are also kept while they are new since their frequency of usage may still change. Associations that are old and frequent are kept under Alternative A, as part of the master Index. This is especially so, if they are reviewed by an expert, such as a librarian. They are probably best removed from the Auxiliary Index (140), under Alternative B.

Figure 3:
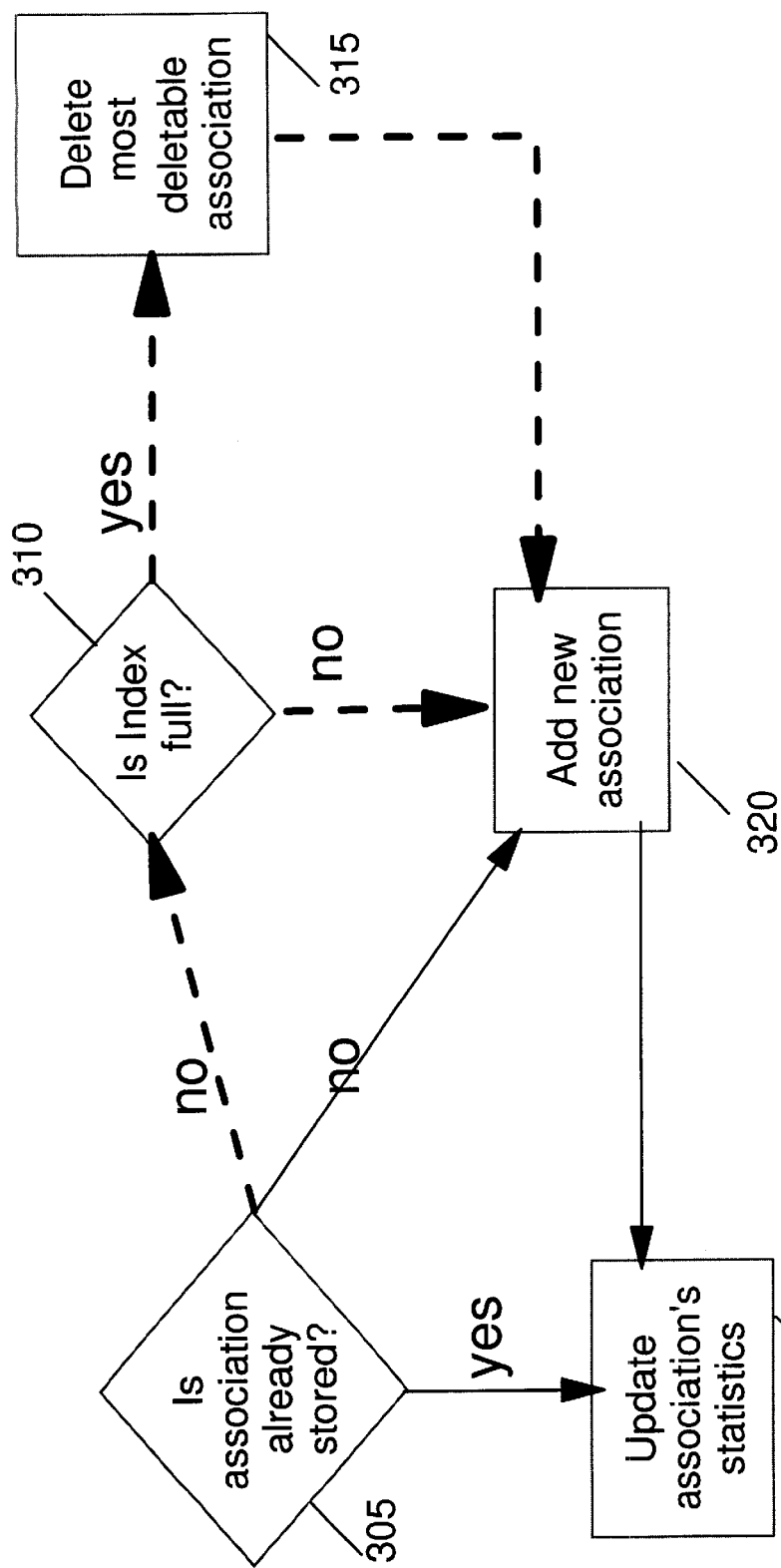
FIG. 3 shows an example of the process flow of updating the keyword-object associations in accordance with the present invention.

FIG. 3 describes an example of an updating process flow. When a user session ends with a response indicating satisfaction, one or more associations are made between keywords in the original user query and the objects satisfying the query session. These associations are then added to either the master Index or the Auxiliary Index. A determination is made to determine if the association exists already (305). If yes, its statistics of date and usage are updated (325), if they are kept by the system. If the association does not exist, it should be added. A determination is made to determine if the index is at maximum size (310). If yes, the most "deletable" association is deleted to make room (315). Then the new association is added (320) with its statistics (325).

FIG. 4 describes an example showing an overall flow of the system. The user submits a query (401) which is matched against the Keyword Index (405) and against the Auxiliary Index (410) under Alternative B. If this is the user's first query in a session (412), the query (and its statistics) is stored in the Updating module (413). The matched keywords are used by the system to retrieve objects associated with them (425). The objects (or their description) are then displayed to the user (430). If the user enters a response which indicates satisfaction (440), the first query stored (in step 413) is parsed into keywords (445). Each keyword is associated with an object, and optionally, statistics of date and usage are updated for each association (450). Under Alternative A, the Master Index is updated with these associations directly (455). Under Alternative B, the Auxiliary Index is updated (460).

If the user's response (440) does not indicate satisfaction, this may be either because there was no response at all (435), in which case the session is considered over; or it may be because the response was a further query, reiterating the interaction within the same session. (401).

Thus the presenting invention provides a method for updating a keyword index for searching a data object in a repository. The method includes providing a search engine for the data repository. The search engine is available for responding to at least one query from a user in a user session. The data repository has an associated keyword index linking keywords with each of a plurality of data objects. The method also includes the steps of: receiving at least one query from the user in a user session; analyzing the query; matching the query against the keyword index; responding to the query with at least one particular data object from among the data objects; determining user's satisfaction with the search results; and updating the keyword index to form a modified keyword list which includes at least a portion of the analyzed query linked to the at least one particular data object.

In some embodiments, the method further includes employing the modified keyword list in a subsequent user session.

In some embodiments, the step of analyzing includes the steps of: parsing the query using a natural-language parser to break the query up into keywords and/or multi-word terms; and/or remove words that are not relevant for search; and/or normalize words, such as by morphological analysis or by stemming; and/or substitute Boolean operators for natural-language words like "both", "and", "or". If the query is Boolean, the analysis consists of breaking up a complex Boolean expression into logically equivalent simplified Boolean expressions.

The step of matching consists of comparing each keyword (or combination of keywords) of the analyzed query with the keywords in the keyword index. Several matching algorithms may be used—perfect string match, partial match of query portion to keyword, etc.

In some embodiments, the step of responding includes: storing all queries of a user session; analyzing at least one of the queries into keywords (or combinations of query words); matching the at least one query word with the index keywords; and determining the at least one particular data object based on the result of the step of matching. Sometimes, the step of responding further includes sending the user a first description of the at least one particular data object.

In some embodiments, the method further includes analysis of the user's input following the system response in order to detect a first level of satisfaction, and/or higher levels of user satisfaction; and/or the step of determining complete user satisfaction, which indicates the end of a user session.

In some embodiments, the step of updating occurs only if a sufficient level of user's satisfaction was determined from the user's response. Updating includes updating statistics for at least one word of each query of the at least one session, wherein the at least one word is linked with the at least one particular data object; and/or the statistics include frequency of utilization; and/or the statistics include a time stamp; and/or the statistics include a time stamp and further includes the step of employing the statistics for updating the keyword index; and/or the step of removing at least one keyword in the keyword index based on the statistics.

In some embodiments, the step of updating includes the step of adding to the keyword index at least one keyword from a user session, if the session ended in a sufficient level of satisfaction. In some embodiments, the step of removing is repeated in accordance with a removal policy.

In some embodiments, the user is connected to the repository via an Internet connection The presenting invention also provides a method for dynamically modifying a user's query. In an embodiment, the method includes analyzing at least one of the queries into keywords (or combinations of query words); and matching the at least one query word against both an auxiliary keyword index, created from keywords of previous users' sessions and the keyword index associated with the database. The results of the two matches may then be combined and presented to the user.

The dynamic modification can also include an intermediary step, where matching keywords from the auxiliary index can be presented to the user for approval before merging or before submitting them as a query to the search engine.

In some embodiments, the step of employing includes using the modified keyword index in a subsequent user sessions.

In some embodiments, the method further comprises the step of purging keywords upon receiving a purge keywords command; and/or the step of forming a purge keywords command when a usage index is below a predetermined value; and/or presenting keyword statistics to an authorized user to make manual changes to the master index.

The presenting invention also provides an apparatus for updating at least one keyword search index, searchable by a search engine responding to at least one query from a user in a first session. An example embodiment is shown in FIG. 5. The apparatus includes: a statistics module (130) which stores time and frequency statistics of usage of keywords associated with each of a plurality of data objects in a database; a receiver (105) to receive and store the at least one query; a responder (135) to respond to the at least one query with at least one particular data object; and an updating module (125) to update the index by forming a modified keyword list which includes at least a portion of the at least one query in keywords linked to the at least one particular data object.

In some embodiments of the apparatus the receiver comprises a cache for storing the at least one query; and/or the updating module employs the modified keyword list in a subsequent user session. In some embodiments, the receiver includes: a memory (511) to store queries included in the at least one query, and/or a query analyzing module (520) to break up the query into words, keywords or simpler Boolean expressions. In some embodiments the updating module includes a matching module (512) to match the at least one query with the keywords and to determine the at least one particular data object based on the results of the match. In some embodiments, the responder includes a merging module (514), that merges the results from the search engine based on the keyword index with results from the auxiliary index, based on the updating module data. Sometimes, the responder (135) sends the user a first description of the at least one particular data object; and/or the receiver receives a user response indicating a first level of satisfaction; and/or the responder (135) satisfies the at least one query based upon the user response; and/or the receiver includes a detector (515) to detect a session terminating response to the at least one user query; and/or the updating module updates statistics for at least one word in each query of the at least one query, wherein the at least one word is linked with the at least one particular data object; and/or the words in at least one query of the at least one query form a Boolean Expression; and/or the statistics includes frequency of utilization and/or includes a time stamp; and/or the updating module employs the statistics to update the keyword index; and/or the updating module removes at least one keyword in the keyword index based on the statistics; and/or the updating module adds at least one keyword to the keyword index; and/or the updating module employs a removal policy; and/or the user is connected to the repository via an Internet connection; and/or the terminating response indicates the user's satisfaction of the results of the first session.

The presenting invention also provides an article of manufacture comprising a computer usable medium having computer readable program code means embodied therein for causing an updating of a keyword index, the computer readable program code means in the article of manufacture comprising computer readable program code means for causing a computer to effect any method of the present invention.

The presenting invention also provides a computer program product comprising a computer usable medium having computer readable program code means embodied therein for causing an updating of a keyword index, the computer readable program code means in the computer program product comprising computer readable program code means for causing a computer to effect any method of the present invention.

The presenting invention also provides a program storage device readable by machine, tangibly embodying a program of instructions executable by the machine to perform method steps for dynamically modifying an initial search of a search engine, the method steps comprising the steps of any method of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

It is noted that the foregoing has outlined some of the more pertinent objects and embodiments of the present invention. This invention may be used for many image or image-like applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

Having thus described our invention, what we claim as new and desire to secure by Letters Patent is as follows:

1. A method comprising updating a keyword index for searching a data object in a repository, including the steps of:
   providing a search engine for the data repository, said search engine available for responding to at least one query from a user in a user session, said data repository having an associated keyword index linking keywords with each of a plurality of data objects;
   receiving said at least one query from said user;
   responding to said at least one query with at least one particular data object from among said data objects; and
   updating said keyword index to form a modified keyword list which includes at least a portion of said at least one query in keywords linked to said at least one particular data object.

2. A method as recited in claim 1, further comprising employing the modified keyword list in a subsequent user session.

3. A method as recited in claim 1, wherein the step of responding includes:
   storing all queries of said at least one query session;
   analyzing the query into words or simpler Boolean expressions;
   matching said at least one query with said keywords; and
   determining said at least one particular data object based on the result of the step of matching.

4. A method as recited in claim 3, wherein the step of responding further comprises sending the user a first description of said at least one particular data object.

5. A method as recited in claim 4, wherein the step of responding further comprises determining said user's first level of satisfaction with the search results by analyzing the user actions.

6. A method as recited in claim 5, wherein the step of responding further comprises satisfying said user response.

7. A method as recited in claim 6, wherein the step of responding further comprises determining complete satisfaction of said user, indicating the end of a query session, and/or otherwise determining the end of a query session.

8. A method as recited in claim 7, wherein the step of responding further comprises detecting a terminal success to said at least one user query.

9. A method as recited in claim 1, where the step of updating includes updating statistics for at least one word in each query of said at least one query, wherein said at least one word is linked with said at least one particular data object.

10. A method as recited in claim 9, wherein words in at least one query of said at least one query form a Boolean Expression.

11. A method as recited in claim 9, wherein the statistics include frequency of utilization.

12. A method as in claim 9, wherein the statistics include a time stamp.

13. A method as recited in claim 9, wherein the statistics include a time stamp and further comprises employing the statistics for updating said keyword index.

14. A method as recited in claim 9, further comprising removing at least one keyword in said keyword index based on said statistics.

15. A method as recited in claim 14, wherein the step of removing is repeated in accordance with a removal policy.

16. A method as recited in claim 9, further comprising adding at least one keyword in said keyword index based on said statistics.

17. A method as recited in claim 1, wherein the user is connected to the repository via an Internet connection.

18. An apparatus for updating at least one keyword search index, searchable by a search engine responding to at least one query from a user in a first session, said apparatus comprising:
   a statistics module which stores time and frequency statistics of usage of keywords associated with each of a plurality of data objects in a database;
   a receiver to receive and store said at least one query;
   a responder to respond to said at least one query with at least one particular data object; and
   an updating module to update said index by forming a modified keyword list which includes at least a portion of said at least one query in keywords linked to said at least one particular data object.

19. An apparatus as recited in claim 18, wherein the receiver comprises a cache for storing said at least one query.

20. An apparatus as recited in claim 18, wherein the updating module employs the modified keyword list in a subsequent user session.

21. An apparatus as recited in claim 18, wherein the receiver includes:
   a memory to store queries included in said at least one query;
   a query analyzer to analyze the query into keywords or simpler Boolean expressions;
   a matching module to match said at least one query with said keywords and to determine said at least one particular data object based on the results of the match.

22. An apparatus as recited in claim 21, wherein the responder sends the user a first description of said at least one particular data object.

23. An apparatus as recited in claim 22, wherein the responder comprises a merging module to merge the results obtained from the search engine with the results obtained by matching the user's query against keywords in an auxiliary index.

24. An apparatus as recited in claim 23, wherein the receiver receives a user response indicating a first level of satisfaction.

25. An apparatus as recited in claim 24, wherein the responder satisfies said at least one query based upon said user response.

26. An apparatus as recited in claim 25, wherein the responder includes a detector to detect a session terminating response to said at least one user query.

27. An apparatus as recited in claim 18, where the updating module updates statistics for at least one word in each query of said at least one query, wherein said at least one word is linked with said at least one particular data object.

28. An apparatus as recited in claim 27, wherein words in at least one query of said at least one query form a Boolean Expression.

29. An apparatus as recited in claim 27, wherein the statistics includes frequency of utilization.

30. An apparatus as recited in claim 27, wherein the statistics includes a time stamp.

31. An apparatus as recited in claim 27, wherein the statistics includes a time stamp and the updating module employs the statistics to update said keyword index.

32. An apparatus as recited in claim 27, wherein the updating module removes at least one keyword in said keyword index based on said statistics.

33. An apparatus as recited in claim 32, wherein the updating module employs a removal policy.

34. An apparatus as recited in claim 32, wherein the updating modules adds at least one keyword in said keyword index based on said statistics.

35. An apparatus as recited in claim 18, wherein the user is connected to the repository via an Internet connection.

36. An article of manufacture comprising a computer usable medium having computer readable program code means embodied therein for causing an updating of a keyword index, the computer readable program code means in said article of manufacture comprising computer readable program code means for causing a computer to effect:
   providing a search engine for the data repository, said search engine available for responding to at least one query from a user in a user session, said data repository having an associated keyword index linking keywords for each of a plurality of data objects;
   receiving said at least one query from said user;
   responding to said at least one query with at least one particular data object from among said data objects; and
   updating said keyword index to form a modified keyword list which includes at least a portion of said at least one query in keywords linked to said at least one particular data object.

37. An article of manufacture as recited in claim 36, the computer readable program code means in said article of manufacture further comprising computer readable program code means for causing a computer to effect employing the modified keyword list for a subsequent user session.

38. An article of manufacture as recited in claim 36, wherein the step of responding includes:
   storing all queries of said at least one query session;
   analyzing the query into keywords and/or simple Boolean expressions;
   matching said at least one query with said keywords; and
   determining said at least one particular data object based on the result of the step of matching.

39. A computer program product comprising a computer usable medium having computer readable program code means embodied therein for causing an updating of a keyword index, the computer readable program code means in said computer program product comprising computer readable program code means for causing a computer to effect:
   providing a search engine for the data repository, said search engine available for responding to at least one query from a user in a user session, said data repository having an associated keyword index linking keywords for each of a plurality of data objects;
   receiving said at least one query from said user;
   responding to said at least one query with at least one particular data object from among said data objects; and
   updating said keyword index to form a modified keyword list which includes at least a portion of said at least one query in keywords linked to said at least one particular data object.

* * * * *